2 Sheets--Sheet 1.

J. CAMPBELL.

Improvement in Corn-Planters.

No. 5,078. Reissued Oct. 1, 1872.

Witnessss.

Walter Allen

W. H. Pearce

Inventor.

James Campbell

By Knight Bros

Attorneys

AM. PHOTO-LITHOGRAPHIC CO. N.Y. (OSBORNE'S PROCESS.)

2 Sheets--Sheet 2.

J. CAMPBELL.

Improvement in Corn-Planters.

No. 5,078. Reissued Oct. 1, 1872.

Witnesses.

Walter Allen.

W. H. Pearce

Inventor.

James Campbell

By Knight Bros

Attorneys

AM. PHOTO-LITHOGRAPHIC CO. N.Y. (OSBORNE'S PROCESS.)

UNITED STATES PATENT OFFICE.

JAMES CAMPBELL, OF HARRISON, OHIO, ASSIGNOR TO JAMES CAMPBELL AND WILLIAM CAMPBELL, OF SAME PLACE.

IMPROVEMENT IN CORN-PLANTERS.

Specification forming part of Letters Patent No. 54,642, dated May 8, 1866; reissue No. 3,836, dated February 15, 1870; reissue No. 5,078, dated October 1, 1872.

*To all whom it may concern:*

Be it known that I, JAMES CAMPBELL, of Harrison, in the county of Hamilton and State of Ohio, have invented an Improved Corn-Planter, of which the following is a specification:

This is a walking-planter, primarily designed for planting in "drills," but adapted also to plant in "hills." It is of the class of planters which have rotary droppers or measurers operated by gearing-connection with pilot ground-wheels.

The first part of this invention consists in the employment of a pivoted grain box or hopper as means for throwing the rotary-dropper in and out of gear, and in means for supporting and locking the same. The second part of the invention consists in a fender-plate to support the front of the grain-box and shield the dropper-gearing from dirt. The third part of the invention consists in a peculiar formation of the walls of the grain-box to prevent the grains from crowding beneath the same, under the action of the dropper, and to provide a properly-arranged cove for the cut-off brush. The fourth part of the invention consists in means for holding and adjusting the brush. The fifth part of the invention consists in means for support and journaling the axle of the ground-wheel, and for preventing any spreading of the frame. The sixth part of the invention consists in a hiller attachment of peculiar construction.

Figure 1:
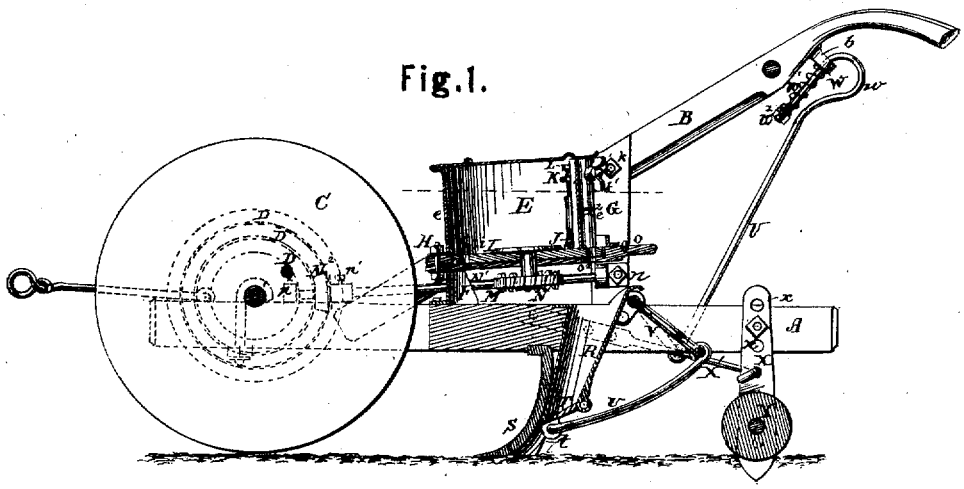
Figure 2:
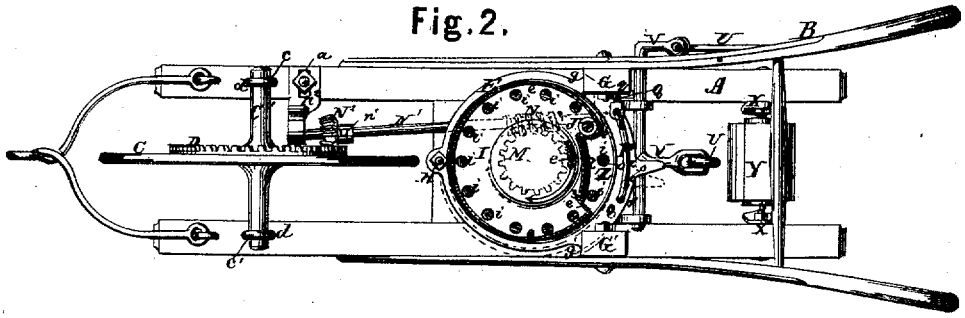
Figure 3:
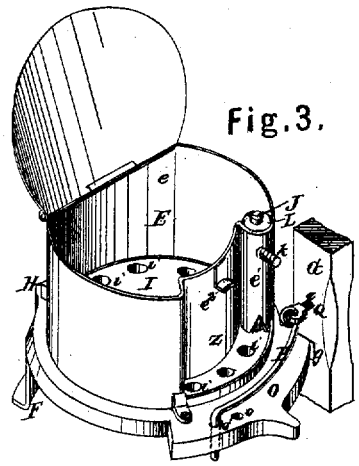
Figure 4:
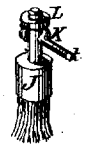
Figure 5:
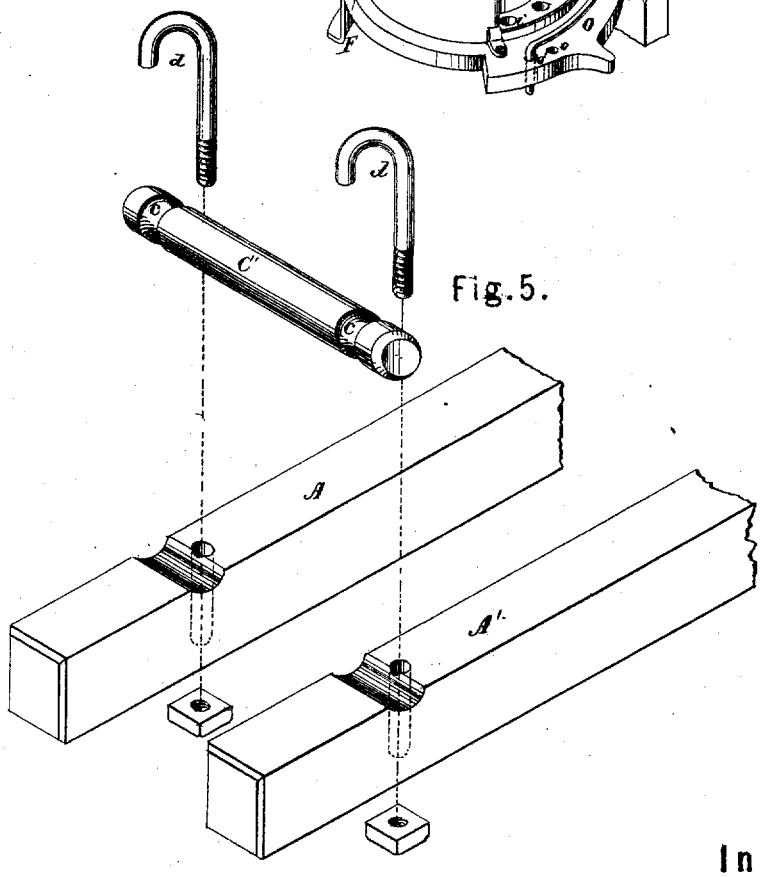

Figure 1 is a vertical longitudinal section of the improved drill. Fig. 2 is a plan or top view of the same, partly in section. Fig. 3 is a perspective view of the grain-box and appurtenances. Fig. 4 is a perspective view of the cut-off brush and its support. Fig. 5 is a perspective view on a larger scale, illustrating the means for journaling the ground-wheel axle.

A represents the right-hand beam, and B the right-hand handle of a customary double-beamed planter-frame. Journaled to the front part of the frame A is a ground-wheel, C, having a series of concentric bevel-gear wheels, D. The axle C′ of the ground-wheel C has two circumferential grooves, *c c′*, to receive hooks or staples *d*, which serve to journal the same, and also to hold the drive-wheel in gear with its pinion and to prevent the spreading of the beams. The grain-box E is pivoted in front to a curved plate, F, by pivot-bolt H, and its back is supported in two notches, *g g′*, in posts G G′. The curved plate F, likewise, serves the purpose of a fender to intercept and divert to either side all trash and dirt that would otherwise pass underneath the grain-box and clog the gearing and grain-passages. The grain-box E is composed of a bottom plate, O, which supports a body, *e*, cylindrical in general shape, to conform to the circular rotary drop-plate or dropper I, which forms the entire floor thereof, so as to leave no space for the lodgment of grain. The dropper I is pierced, at equal distances around its circuit, with grain-measuring apertures *i*, each capable of receiving a single grain or the desired modicum of corn or other grain. The body *e* of the grain-box E, at a proper point for the cut-off brush J, trends inward so as to form a cove, $e^1$, for the reception of the brush. From thence the wall extends to the general periphery on a line $e^2$. $e^3$ represents a gate to admit return grains. The space Z external of the indented wall $e^1$ $e^2$ is left open to expose the cells as they pass to and over the delivery-aperture $o^2$, so that any failure to operate may be at once seen and corrected. Should surplus grains escape they may be carried back by the empty cells through the gate $e^3$. The formation of the box also serves to prevent the crowding of grains or kernels under the edge of the same. The grain is carried directly against and under the brush J. At all other points, owing to this construction, the grain revolves concentric with or away from the walls, as indicated by arrow in Fig. 2. If it be preferred to employ a round brush the end of the cove $e^1$ may have a concave form, as shown in Fig. 2. The brush J is held in position by means of a hook, K, having a screw-shank, *k*, and nut *k′*, and by a head, L, which fits and occupies the upper part of the recess $e^1$. This arrangement permits the use of the cheap and easily-renewed common circular brush, which brush, when worn or bent to one side, can be restored to efficiency by slackening the nut *k′* and partially rotating the brush so as to present a new and unworn set of bristles to the action of the grain. A common painter's brush may be employed by cutting it of proper length and furnishing it with a washer or disk, L, to form the head. The rotary dropper or grain-measurer I is furnished underneath with a worm-pinion, M, actuated by a worm-wheel, N, driven from the ground-wheel. The worm-wheel shaft $N^1$ is fitted at its front end with a bevel-pinion, $N^2$, held by set-screw $n^1$, and thus shiftable into mesh with either of the gears D on the ground-wheel C. A slotted bracket, $n^2$, supports the shaft at this end, being secured by bolt *a*, and suitably held against lateral movement. The mesh of the front gearing may thus be regulated, and the pinion $N^2$ readily shifted by simply loosening the nut of the bolt *a*, and driving the pinion out of mesh, and then into mesh with the proper gear. The box-plate O has two or more perforations, *o o'*, to receive a hook, P, linked to an eye, Q, which eye has a screw-shank, *q*, by which it can be adjusted forward or backward, so that when the hook P is engaged in the perforation *o'*, the worm-gearing M N will be accurately in mesh.

When it is desired to disconnect the seed-delivery mechanism the hook P is withdrawn from the perforation *o'*, and the box E being shifted to the left, the hook P is inserted in the perforation *o*, so as to hold the worm-pinion out of gear. The hook P being linked to the same post G to which is attached the rear journal-box *n* of the worm-shaft $N^1$, the worm N and its pinion M are held securely in gear, and are not liable to be spread apart by an accidental crowding of large grains, as would occur were the said hook and journal-bearing connected to different parts of the frame.

The rotation of the dropper or seed-measurer causes a single grain at a time, or desired modicum of grains, to drop, at regular intervals, into a spout, R, arranged immediately behind a drill-tooth, S.

The lower end of the spout slopes obliquely upward from the rear of the drill-tooth, and is, when the implement is used for planting in "hills," closed by a valve, T, connected by rods U and arms V with a spring-trigger, W. The valve T is hinged at its upper end directly to the spout R, and is constructed with an arm, *t*, to which the lower connecting-rod U is attached. The spring-"trigger" or pull W consists of a hook, *w*, and a spiral spring, $w^1$, applied to the end of the same between an abutment-guide, *b*, projecting from the handle B, and an adjusting-nut, $w^2$. The hook *w* may be engaged with directly by a finger in usual manner. X X represent covering-shares, having perforations *x*, by which to vary the depth of cut. X' X' represent braces for the same, and Y a roller pivoted between the coverers.

The arrangement and position of the drill-tooth and dropping-spout are such as to protect the latter from interference by clods or trash, the upward and rearward inclination of the valve T enabling trash to easily escape it, and also enabling the grain to be liberated near the ground by a slight motion of the valve, and without striking it against the ground. The flare and obliquity of the dropping-spout upward and rearward, and its distance below the drop-plate, are such as to afford the husbandman an uninterrupted view of the descending grain on its way from the dropping-plate to the ground, so that should the spout or other portion of the grain-passages become clogged, the defect can be forthwith observed and remedied.

The provision for adjusting the worm-gear accurately to mesh enables the machine to be operated with more certainty and less labor than is usual with planters of this class.

The following is claimed as new:

1. A rotary-dropper grain-box, E, shiftable on a vertical pivot, substantially as herein described, as means for throwing the dropper-gearing in and out of mesh.

2. The combination with the pivoted grain-box E, of the perforations *o o'*, hook P, and adjusting hinge-bolt Q, for the purposes set forth.

3. The curved fender-plate F, supporting the front of the grain-box, and shielding the dropper-gearing, substantially as shown and described.

4. The brush-cove $e^1$, formed by the indented wall of the circular grain-box E, and arranged and operating substantially as shown and described, in combination with a rotary dropper, I, for the purposes specified.

5. In combination with the cove $e^1$, we claim the cut-off brush J, when constructed with a head, L, and held by the clamp K *k k'*, in the manner represented, to adapt it to be raised, lowered, or rotated as required, to insure its efficient action and uniform wear.

6. The combination, with the driving-wheel C, of the circumferentially-grooved axle C' *c c'*, and staples *d d*, substantially as and for the purpose set forth.

7. The journal-box N of the worm-shaft $N^1$, and the hook P, for holding the pinion M in and out of mesh with the worm N, the same being both attached to one and the same post, G, as herein shown and described, for the purpose set forth.

8. The spring-pull W, for operating the hiller-valve U, the same consisting of a hook, *w*, and a spring, $w^1$, between an abutment-guide, *b*, and adjusting-nut $w^2$, substantially as herein shown and described.

In testimony of which invention we hereunto set our hands.

JAMES CAMPBELL.
WILLIAM CAMPBELL.

Attest:

GEO. H. KNIGHT,
P. W. FRANCIS.